H. C. TRIPP.
WINDSHIELD CLEANER.
APPLICATION FILED MAR. 5, 1919.
1,394,052.
Patented Oct. 18, 1921.
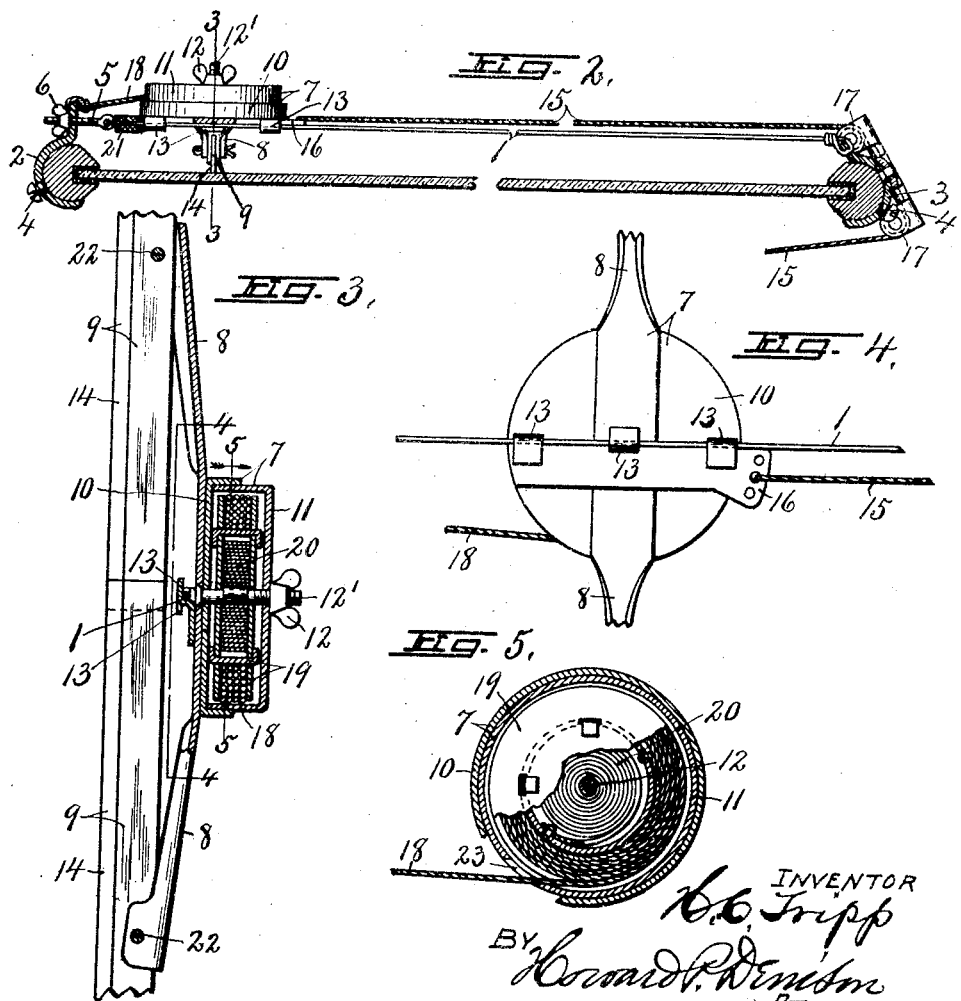

UNITED STATES PATENT OFFICE.

HENRY C. TRIPP, OF AUBURN, NEW YORK.

WINDSHIELD-CLEANER.

1,394,052.   Specification of Letters Patent.   Patented Oct. 18, 1921.

Application filed March 5, 1919. Serial No. 280,768.

*To all whom it may concern:*

Be it known that I, Dr. HENRY C. TRIPP, a citizen of the United States of America, and resident of Auburn, in the county of Cayuga, in the State of New York, have invented new and useful Improvements in Windshield-Cleaners, of which the following, taken in connection with the accompanying drawings, is a full, clear, and exact description.

This invention relates to certain improvements in cleaners for wind shields and analogous transparent plates commonly used on automobiles and other vehicles and involves the use of a suitable wiper movable across the front face of the shield from side to side or such portion thereof as may be necessary to clean from rain, snow or dust to maintain a clear vision therethrough.

The main object is to enable the wiper to be more conveniently and expeditiously moved back and forth across and against the surface of the glass than as heretofore been practised.

One of the specific objects is to provide the wiper with a relatively small compact spring motor connected in such manner that when the wiper is drawn in one direction the spring will be tensioned sufficiently to automatically return the wiper to its starting position.

Another object is to provide means within easy reaching distance of the operator for moving the wiper across the glass in one direction against the action of the retracting spring or motor.

Other objects and uses relating to specific parts of the cleaning device will be brought out in the following description.

In the drawings:

Figure 1, is a rear elevation of a wind shield and my improved cleaning device attached thereto.

Fig. 2, is an enlarged horizontal sectional view through the wind shield partly broken away taken on line 2—2 Fig. 1 showing the cleaning device partly in top plan and partly in section.

Fig. 3, is an enlarged vertical sectional view taken on line 3—3 Fig. 2.

Fig. 4, is a rear elevation of the motor and adjacent portions of the wiper viewed in the plane of line 4—4 Fig. 3.

Fig. 5, is a detail sectional view taken on line 5—5 Fig. 3.

As illustrated this cleaning device comprises a guide wire —1— extending across the front face of the wind shield —A— from side to side and approximately midway between the lower and upper edges thereof and has its opposite ends attached to suitable clamps —2— and —3— which are removably secured by set screws —4— to the opposite upright end rails as —a— of the wind shield aided by the tension of the guide wire —1— which may be of piano wire or any other suitable guide capable of supporting the wiper and motor thereon and of holding these parts in inoperative position by being moved back and forth across the front face of the shield.

Both of the clamps —2— and —3— are preferably hook shaped to fit snugly around and upon the upright end rails of the shield so that when the guide wire is tightened they will be frictionally held in their adjusted positions aided by the set screws —4—.

One of the clamps as —3— at the left hand side of the shield is provided with an adjusting screw —5— to which the adjacent end of the guide wire —1— is secured, said screw being provided with a thumb nut —6— for adjusting the screw in one direction or the other and thereby tighten or release the guide wire as may be required, the opposite end of the wire being similarly attached to the corresponding clamp —4—, if desired.

The support for the motor and wiper shown comprises a relatively small circular case —7— movable along and upon the guide wire —1— and provided with opposite radially projecting arms —8— extending vertically some distance beyond the lower and upper edges of the case —7— for receiving and supporting a pair of similar and interchangeable wiper blades —9—.

When the wind shield is made into two upper and lower sections the arms —7— are made to extend to approximately the longitudinal centers thereof while the wiper blades are of substantially the same length as the vertical width of the shield sections and are pivoted intermediate their ends to the free ends of their respective arms —8— by means of cotter pins or equivalent easily removable pivots to permit the blades to be removed and replaced at will.

The case —7— is arranged edgewise vertically and is preferably composed of cup-shaped sections —10— and —11— telescopically assembled one within the other and may be termed respectively the rear or base section and the front or cap section, the rear section being provided with a central forwardly projecting threaded stud extending through a central aperture in the front section —11— for receiving a thumb nut —12— by which the two sections may be firmly clamped together to form an intervening chamber for receiving a suitable spring motor and a reel presently described.

In order that the wiper may be properly supported in an upright position upon the guide wire —1— the rear wall of the case section —10— is provided with a series of, in this instance three, bearings —13— in spaced relation horizontally and substantially diametrically of the case, two of the bearings being located near the opposite side of the case to rest upon the upper edge of the wire while the other bearing is approximately at the center of the case and engages the lower edge of the wire.

These bearings are preferably hook shaped for engaging the rear face of the guide wire and holding said wire against said wall of the case thereby retaining the wiper upon the wire in sliding engagement therewith and at the same time permitting it to be removed from the wire by simply withdrawing the latter through the open sides of the bearings.

The arms —8— carrying the wiper blades —9— are secured to the rear wall or section —10— of the case while the blades —9— project rearwardly beyond the arms —8— and are provided along their rear edges with flexible rubber inserts —14— for wiping contact with the front face of the shield as the wiper is moved back and forth along the guide wire —1— in a manner presently described.

The guide wire is arranged in sufficiently close proximity to the front face of the shield to exert more or less pressure of the wiper against the shield in all positions of adjustment, it being understood that the wiping edges of the blades —9— when in contact with the glass of the shield holds the remaining portions of the wiper including the case —7— clear from the glass to avoid injury thereto by scratching or otherwise.

The means for moving the wiper at will in one direction, preferably to the right, consist of a cord or cable —15— having one end attached to a suitable anchorage —16— on the corresponding side of the rear section —10— of the case —7— and its other end passed around a pair of sheaves —17— on the right hand clamp —3— so as to avoid friction with the adjacent side of the frame of the shield and also to permit the free end of the cable to be brought around to the rear side of the shield within easy reaching distance of the operator.

The means for automatically returning the wiper along the guide in an opposite direction consist of a cable —18— having one end attached to the left hand clamp —2— and its other end attached to a motor actuated reel —19— within the case —7—.

This reel preferably consists of a pair of circular disks journaled upon the central stud as —12'— in axially spaced relation and a circular band secured to and between the disks some distance from the axis thereof to form a circular chamber for receiving a spring motor —20—, said band being also disposed some distance within the periphery of the disks to form an annular groove for the reception of the cord or cable —18—.

The motor is preferably of the flat coil spring type having one end secured to the stud —12'— and its other end secured to the reel in such a manner as to cause a gradually increasing tension of the spring as the wiper is drawn to the right by the cable —15— during which operation the reel will be rotated against the action of the spring by the cable —18—.

A suitable buffer —21— is provided at the left hand end of the guide wire —1— to reduce the sudden impact of the wiper at the end of its return stroke by the spring motor in case the wiper should be released to return under full force of the spring.

When the cleaning device is assembled upon the shield in the manner described and it is desired to clean the glass from rain, snow or dust the operator simply draws upon the cable —15— thereby moving the wiper across the shield to any desired extent against the action of the spring —20— which upon the release of the tension upon the cable —15— will instantly return the wiper.

The arms —8— and the cross piece of which the anchor —16— is a part are secured preferably by spot welding to the back of the case section —10—, and therefore, those parts form substantially a unitary part of the case. The pivots as —22— by which the wiper blades are secured to the arms —8— permits said blades to readily adjust themselves to the surface of the glass against which they are pressed.

The section —11— of the case —7— is provided with a tangential opening —23— in one side to permit the cable —18— to pass readily therethrough as the wiper is moved back and forth along and upon the guide wire —1—. Otherwise, the invention is believed to be sufficiently described to enable any one skilled in the art to make and use the same, but I do not wish to limit myself to the specific structure shown and described since it is obvious that various changes may be made in the detail construction without departing from the spirit of this invention.

What I claim is:

A wind-shield-cleaner comprising a guide to extend across the wind-shield, a relatively small circular casing or housing movable along said guide, arms secured to and extending radially from said housing in opposite directions, wipers mounted on said arms, a reel rotatably mounted within the housing, a coil-spring also mounted within the housing for rotating the reel in one direction, a cable wound upon the reel and having one end attached thereto and its other end provided with means for attachment to one side of the wind-shield-frame, and means for moving the housing across the wind-shield against the action of the retracting-spring.

In witness whereof I have hereunto set my hand this 1st day of March, 1919.

HENRY C. TRIPP.

Witnesses:
H. E. CHASE,
ANNA G. JORDAN.